United States Patent [19]

Kang

[11] Patent Number: 5,424,615

[45] Date of Patent: Jun. 13, 1995

[54] DISCHARGE LAMP BALLAST OPERATING ON INDUCED VOLTAGE IN THE PRIMARY WINDING OF A BOOSTING TRANSFORMER

[75] Inventor: Bog Youn Kang, Cheongju, Rep. of Korea

[73] Assignee: Goldstar Instrument & Electric Co., Ltd., Seoul, Rep. of Korea

[21] Appl. No.: 54,217

[22] Filed: Apr. 30, 1993

[30] Foreign Application Priority Data

Jul. 11, 1992 [KR] Rep. of Korea .............. 12386/1992

[51] Int. Cl.$^6$ ............................................. H01P 7/00
[52] U.S. Cl. ................................... 315/219; 315/244; 315/239
[58] Field of Search .............. 315/212, 219, 239, 244, 315/245, 307, DIG. 7

[56] References Cited

U.S. PATENT DOCUMENTS

| | | | |
|---|---|---|---|
| 4,075,476 | 2/1978 | Pitel | 315/239 |
| 4,392,087 | 7/1983 | Zansky | 315/219 |
| 4,463,286 | 7/1984 | Justice | 315/244 |
| 4,503,361 | 3/1985 | Hanlet | 315/219 |
| 5,010,278 | 4/1991 | Kang | 315/307 |
| 5,148,087 | 9/1992 | Moisin et al. | 315/307 |
| 5,191,263 | 3/1993 | Konopka | 315/209 R |
| 5,220,247 | 6/1993 | Moisin | 315/209 R |

FOREIGN PATENT DOCUMENTS 2022186 12/1992 WIPO ................... 315/219

*Primary Examiner*—Robert J. Pascal
*Assistant Examiner*—Darius Gambino
*Attorney, Agent, or Firm*—Oliff & Berridge

[57] ABSTRACT

An electronic ballast circuit for discharge lamps, comprising a boosting transformer for applying a high voltage as a discharging voltage to the discharging lamps, the high voltage being induced in a main secondary winding of the transformer according to forward and reverse currents flowing through a primary winding of the transformer, a charging section for charging a voltage from an input power source terminal, first and second switching sections for repeatedly performing switching operations contrary to each other, a resonance section for allowing the forward current to flow through the primary winding of the boosting transformer when the first switching section conducts and allowing the reverse current to flow through the primary winding of the boosting transformer when the second switching section conducts, and a plurality of condensers, each connected between the secondary winding of the boosting transformer and a filament of a corresponding one of the discharge lamps, the condensers limiting amounts of discharging currents to the discharge lamps.

16 Claims, 6 Drawing Sheets

DISCHARGE LAMP BALLAST OPERATING ON INDUCED VOLTAGE IN THE PRIMARY WINDING OF A BOOSTING TRANSFORMER

BACKGROUND OF THE INVENTION

1. Field of the Invention

The present invention relates in general to an electronic ballast for discharge lamps such as fluorescent lamps, and more particularly to an electronic ballast circuit for discharge lamps which is capable of generating a high voltage required to light the discharge lamps using a transformer and limiting amounts of currents flowing to the discharge lamps after the lighting of the discharge lamps, so that an amount of light from the discharge lamps can be maintained constantly.

2. Description of the Prior Art

Referring to FIG. 1, there is shown a circuit diagram of a conventional electronic ballast circuit for discharge lamps. As shown in this drawing, the conventional electronic ballast circuit comprises transistors Q1 and Q2 and a transformer T for driving bases of the transistors Q1 and Q2. The transistor Q1 has a collector connected to a power source terminal Vcc, which is also connected to a condenser C1 through a resistor R1. A connection point of the resistor R1 and the condenser C1 is connected to a secondary winding T22 of the transistor base driving transformer T through a diac DA1 and to a base of the transistor Q2 through parallel connected condenser C3 and resistor R3. The connection point of the resistor R1 and the condenser C1 is also connected commonly to an emitter of the transistor Q1 and a collector of the transistor Q2 through a diode D1. The connection point of the resistor R1 and the condenser C1 is also connected to a base of the transistor Qt through another secondary winding T21 of the transformer T and parallel connected condenser C2 and resistor R2. A common connection point of the emitter of the transistor Q1 and the collector of the transistor Q2 is connected to filament terminals of discharge lamps LP1 and LP2 through a primary winding T11 of the transformer T and reactors L1 and L2. The power source terminal Vcc is also connected commonly to the other filament terminals of the discharge lamps LP1 and LP2 and a condenser C5 through a condenser C4. A condenser C6 is connected between the filament terminals of the discharge lamp LP1 and a condenser C7 is connected between the filament terminals of the discharge lamp LP2. The reference numerals D2 and D3, not described, designate diodes for protecting the transistors Q1 and Q2 when the transistors Q1 and Q2 are turned on/off, respectively.

The operation of the conventional electronic ballast circuit with the above-mentioned construction will hereinafter be described.

Upon application of an electric power to the power source terminal, the power is applied to the second filament terminals of the discharge lamps LP1 and LP2 and the condenser C5 through the condenser C4. The power is also applied to the condenser C1 through the resistor R1. As a result, the condenser C1 charges. The power is also applied to the first filament terminals of the discharge lamps LP1 and LP2 through the diode D1, the primary winding T11 of the transformer T and the reactors L1 and L2. As a result, the condensers C6 and C7 charge.

When a charging voltage on the condenser C1 reaches a level for biasing the diac DA1 into conduction, the diac DA1 conducts, thereby causing the charging voltage on the condenser C1 to be applied to the base of the transistor Q2 through the diac DA1 and the parallel connected condenser C3 and resistor R3. As a result, the transistor Q2 is turned on.

When the transistor Q2 is turned on, a current from the condenser C4 flows through the second filament terminals of the discharge lamps LP1 and LP2, the condensers C6 and C7, the first filament terminals of the discharge lamps LP1 and LP2, the reactors L1 and L2, the primary winding T11 of the transformer T and the transistor Q2.

The condensers C6 and C7 and the reactors L1 and L2 constitute resonance circuits, respectively. A quality factor Q of each resonance circuit is as follows:

$$Q = \omega L/R = 1/\omega CR$$

At an initial condition, since a resistance across each of the discharge lamps LP1 and LP2 is infinite, a voltage of several hundred volts is induced across each of the discharge amps LP1 and LP2 in proportion to the Q value, resulting in an initial discharge thereof.

Thereafter, when no current from the reactors L1 and L2 flows toward the primary winding T11 of the transformer T at a resonance frequency ($f = \frac{1}{2}\pi\sqrt{LC}$) because of the resonances by the condensers C6 and C7 and the reactors L1 and L2, a high voltage is induced at each dotted point of the secondary windings T21 and T22 of the transformer T, thereby causing a low voltage to be applied to the base of the transistor Q2 and a high voltage to be applied to the base of the transistor Q1. As a result, the transistor Q2 is turned off and the transistor Q1 is turned on.

In the case where the transistor Q2 is turned off and the transistor Q1 is turned on in the above manner, a current from the transistor Q1 flows to the condenser C5 through the primary winding T11 of the transformer T, the reactors L1 and L2 and the discharge lamps LP1 and LP2.

Then, when no current from the primary winding T11 of the transformer T flows toward the reactors L1 and L2 because of the resonances by the reactors L1 and L2 and the condensers C6 and C7, a counter electromotive force is generated in the primary winding T11 of the transformer T, with its polarity being opposite to that in the previous case. The counter electromotive force in the primary winding T11 of the transformer T causes a low voltage to be induced at each dotted point of the secondary windings T21 and T22 of the transformer T, thereby causing a high voltage to be applied to the base of the transistor Q2 and a low voltage to be applied to the base of the transistor Q1. As a result, the transistor Q2 is turned on and the transistor Q1 is turned off.

In this manner, the transistors Q1 and Q2 are repeatedly turned on/off because of the resonances by the reactors L1 and L2 and the condensers C6 and C7, so that the high voltage can be generated across each of the discharge lamps LP1 and LP2. The high voltages allow the discharge lamps LP1 and LP2 to discharge and, thus, to generate light.

However, the conventional electronic ballast circuit has a disadvantage, in that the discharge of the discharge lamps is performed by applying the high voltage directly to the filaments thereof, resulting in a blackening occurring at a discharging start point of time. The blackening shortens the life of the discharge lamps. Also, the reactors and condensers are required to constitute the resonance circuits in proportion to the number of the discharge lamps. For this reason, particularly when a single ballast circuit is used for a plurality of (at least two) discharge lamps, it is impossible to make a size of the ballast circuit small and a weight thereof light and the cost is increased, due to an increase in the number of the components.

SUMMARY OF THE INVENTION

Therefore, the present invention has been made in view of the above problems, and it is an object of the present invention to provide an electronic ballast circuit which is capable of being used for a plurality of discharge lamps without an increase in the number of reactors and condensers constituting resonance circuits.

It is another object of the present invention to provide an electronic ballast circuit for discharge lamps wherein filaments of the discharge lamps are preheated, resulting in a blackening being prevented at a discharging start point of time.

In accordance with the present invention, the above and other objects can be accomplished by a provision of an electronic ballast circuit for discharge lamps, comprising boosting transformer means having a primary winding and a main secondary winding, said boosting transformer means applying a high voltage as a discharging voltage to one or more discharging lamps, the high voltage being induced in said main secondary winding according to forward and reverse currents flowing through said primary winding; charging means for charging a voltage from an input power source terminal; first switching means for conducting when a forward voltage is induced in a first secondary winding of a transistor base driving transformer; second switching means for conducting when a charging voltage on said charging means is greater than or equal to a predetermined level or when a reverse voltage is induced in a second secondary winding of said transistor base driving transformer; resonance means for allowing the forward current to flow through said primary winding of said boosting transformer means when said first switching means conducts, allowing the reverse current to flow through said primary winding of said boosting transformer means when said second switching means conducts and allowing a counter electromotive force to be induced in a primary winding of said transistor base driving transformer when the current flow through said primary winding of said boosting transformer means is stopped, so that the conduction of said first and second switching means can be controlled according to directions of currents induced in said first and second secondary windings of said transistor base driving transformer by the counter electromotive force in said primary winding of said transistor base driving transformer; and a plurality of condensers, each connected between said secondary winding of said boosting transformer means and a filament of a corresponding one of said discharge lamps, said condensers limiting amounts of discharging currents to said discharge lamps.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
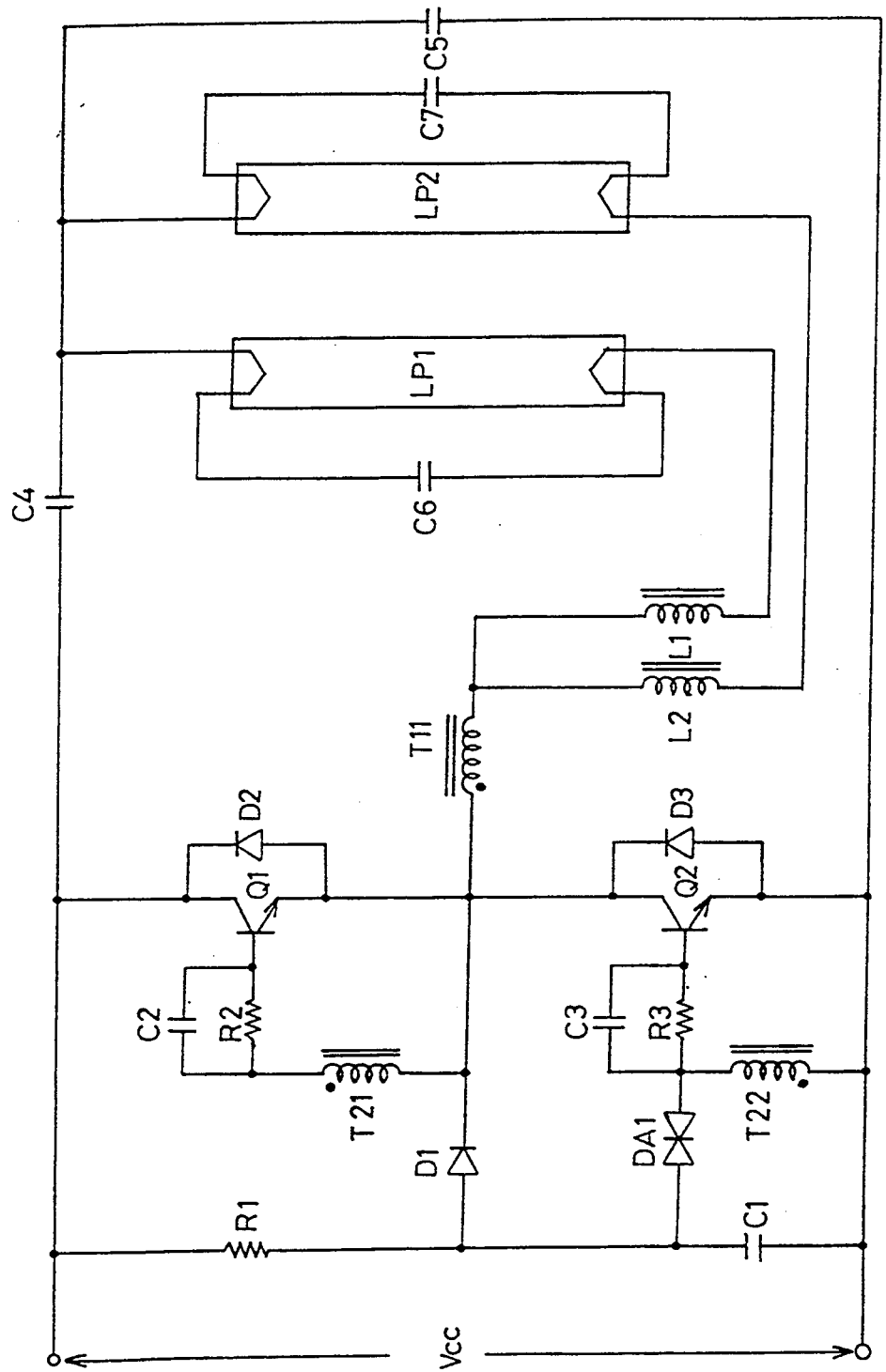
FIG. 1 is a circuit diagram of a conventional electronic ballast circuit for discharge lamps.
Figure 2:
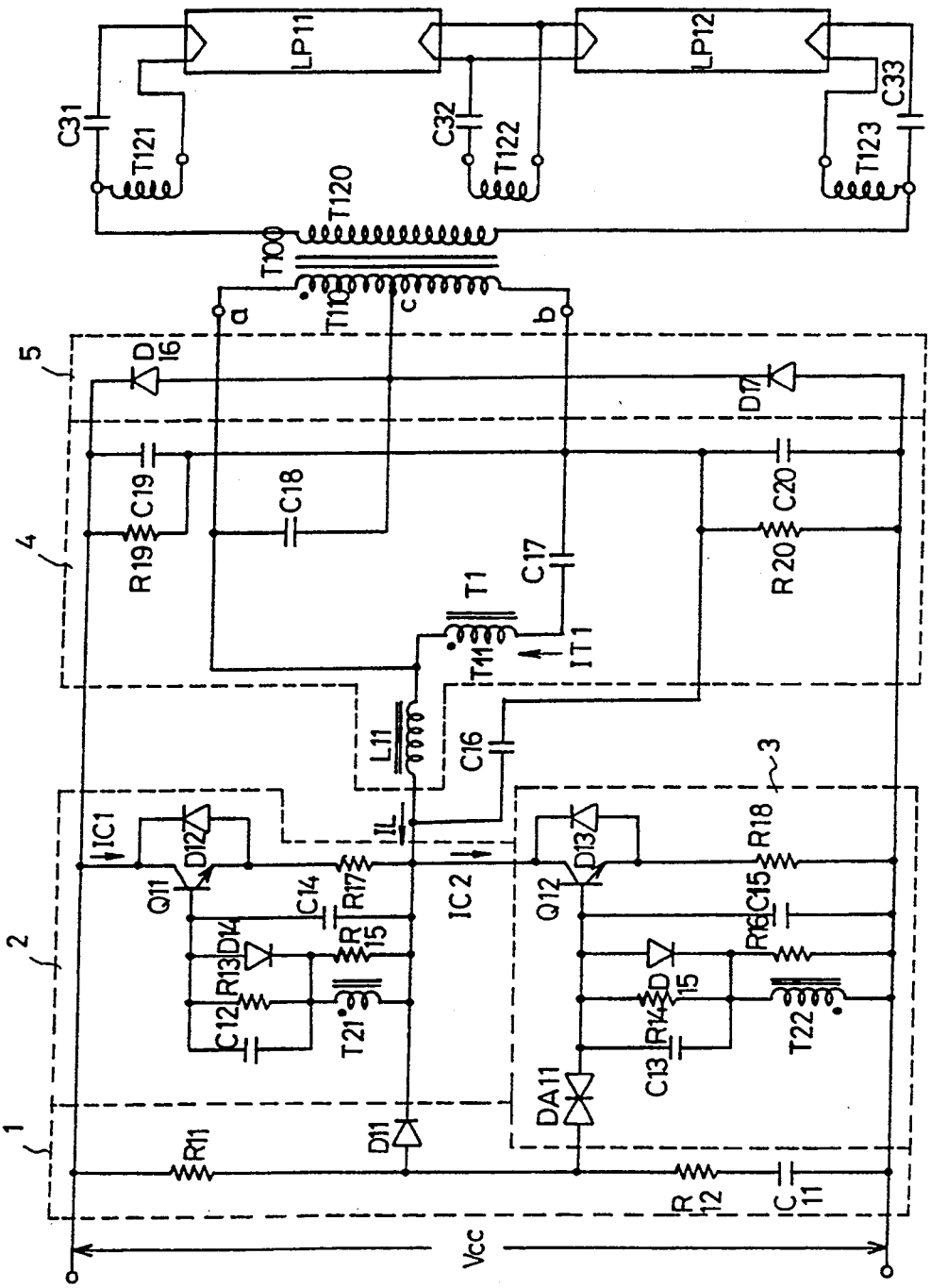
FIG. 2 is a circuit diagram of an electronic ballast circuit for discharge lamps in accordance with an embodiment of the present invention.

Referring to FIG. 2, there is shown a circuit diagram of an electronic ballast circuit for discharge lamps in accordance with an embodiment of the present invention. As shown in this drawing, the electronic ballast circuit of the present invention comprises a boosting transformer T100 having a primary winding T110, a main secondary winding T120 and sub-secondary windings T121-T123. The boosting transformer T100 is adapted to apply a high voltage to filaments of discharge lamps LP11 and LP12, the high voltage being induced in the main secondary winding T120 according to forward and reverse currents flowing through the primary winding T110. The boosting transformer T100 is also adapted to apply voltages induced in its sub-secondary windings T121-T123 as preheating voltages to the filaments of the discharge lamps LP11 and LP12 before the discharge of the discharge lamps LP11 and LP12 is started.

The electronic ballast circuit of the present invention also comprises a charging section 1 for charging a voltage from an input power source terminal Vcc, a first switching section 2 for conducting when a forward voltage is induced in a secondary winding T21 of a transistor base driving transformer T1, a second switching section 3 for conducting when a charging voltage on the charging section 1 is greater than or equal to a predetermined level or when a reverse voltage is induced in another secondary winding T22 of the transistor base driving transformer T1, and a resonance section 4 for allowing the forward current to flow through the primary winding T110 of the boosting transformer T100 when the first switching section 2 conducts and allowing the reverse current to flow through the primary winding T110 when the second switching section 3 conducts. The resonance section 4 is also adapted to allow a counter electromotive force to be induced in a primary winding T11 of the transistor base driving transformer T1 when the current flow through the primary winding T110 of the boosting transformer T100 is stopped, so that the conduction of the first and second switching sections 2 and 3 can be controlled according to directions of currents induced in the secondary windings T21 and T22 by the counter electromotive force in the primary winding T11.

The electronic ballast circuit of the present invention also comprises a high voltage removing (or clamping) section 5 for preventing a high voltage from being induced in the primary winding T110 of the boosting transformer T100 upon conduction/nonconduction of the first and second switching sections 2 and 3, and condensers C31–C33, each connected between the secondary winding T120 of the boosting transformer T100 and the filament of a corresponding one of the discharge lamps LP11 and LP12, the condensers C31–C33 limiting amounts of discharging currents to the discharge lamps LP11 and LP12. In this embodiment, the discharge lamps LP11 and LP12 are connected in series.

The charging section 1 includes series connected resistors R11 and R12, with their connection point being connected to the second switching section 3, a condenser C11 connected to the power source terminal Vcc through the resistors R11 and R12, and a diode D11 connected to the first and second switching sections 2 and 3 and the resonance section 4.

The first switching section 2 includes parallel connected condenser C12 and resistor R13, a resistor R17, and a transistor Q11 having its collector connected to the power source terminal Vcc, its base connected to one terminal of the secondary winding T21 of the transistor base driving transformer T1 through the parallel connected condenser C12 and resistor R13 and its emitter connected through the resistor R17 to a connection point of the charging section 1 and the resonance circuit 4 together with the other terminal of the secondary winding T21 of the transistor base driving transformer T1.

The first switching section 2 is also provided with a condenser C14 connected to the base of the transistor Q11, a diode D14 connected to the base of the transistor Q11, and a resistor R15 connected to the diode D14, the base of the transistor Q11 being connected commonly to the one terminal of the secondary winding T21 of the transistor base driving transformer T1 and the resistor R15 through the diode D14.

The first switching section 2 also includes a diode D12 connected between the emitter and the collector of the transistor Q11.

The second switching section 3 includes a diac DA11 connected to an output of the charging section 1, parallel connected condenser C13 and resistor R14, a resistor R18, and a transistor Q12 having its base connected to the diac DA11 and also to one terminal of another secondary winding T22 of the transistor base driving transformer T1 through the parallel connected condenser C13 and resistor R14, its emitter connected to a ground terminal through the resistor R18 and its collector connected to the connection point of the charging section 1 and the resonance circuit 4.

The second switching section 3 is also provided with a condenser C15 connected to the base of the transistor Q12, a diode D15 connected to the base of the transistor Q12, and a resistor R16 connected to the diode D15, the base of the transistor Q12 being connected commonly to the one terminal of another secondary winding T22 of the transistor base driving transformer T1 and the resistor R16 through the diode D15, the other terminal of the secondary winding T22 of the transistor base driving transformer T1 being connected to the ground terminal.

The second switching section 3 also includes a diode D13 connected between the emitter and the collector of the transistor Q12.

The resonance section 4 includes a condenser C18 connected between one terminal a and a central terminal c of the primary winding T110 of the boosting transformer T100, a resistor R19 and a condenser C19 connected in parallel between the power source terminal Vcc and the other terminal b of the primary winding T110 of the boosting transformer T100, a resistor R20 and a condenser C20 connected in parallel between the other terminal b of the primary winding T110 of the boosting transformer T100 and the ground terminal, a reactor L11 connected between a connection point of the one terminal a of the primary winding T110 of the boosting transformer T100 and one terminal of the primary winding T11 of the transistor base driving transformer T1 and a connection point of the first and second switching sections 2 and 3 and the charging section 1, and a condenser C17 connected between the other terminal of the primary winding T11 of the transistor base driving transformer T1 and the other terminal b of the primary winding T110 of the boosting transformer T100.

The high voltage removing section 5 includes a diode D16 connected between the central terminal c of the primary winding T110 of the boosting transformer T100 and the power source terminal Vcc and a diode D17 connected between the central terminal c of the primary winding T110 of the boosting transformer T100 and the ground terminal.

A noise removing condenser C16 is connected between the other terminal b of the primary winding T110 of the boosting transformer T100 and a connection point of the first and second switching sections 2 and 3 and the resonance section 4.

The diodes D12 and D13 act to enhance switching time when the transistors Q11 and Q12 are turned on/off.

In this embodiment, although the electronic ballast circuit has been applied to two discharge lamps LP11 and LP12, it can be applied to discharge lamps much more than those. This is achieved by increasing the turn number of the secondary winding T120 of the boosting transformer T100 and the number of the sub-secondary windings of the boosting transformer T100 and the associated condensers in proportion to the number of the discharge lamps.

The first switching section 2 may include a field effect transistor containing a diode therein, instead of the transistor Q11 and the diode D12. Similarly, the second switching section 3 may include a field effect transistor containing a diode therein, instead of the transistor Q12 and the diode D13.

The operation of the electronic ballast circuit with the above-mentioned construction in accordance with the embodiment of the present invention will hereinafter be described in detail with reference to FIGS. 4A to 4F and 5A to 5E.

Upon application of a direct current (PC) voltage to the power source terminal Vcc, the DC voltage is divided by 2 by the parallel connected resistor R19 and condenser C19 and the parallel connected resistor R20 and condenser C20. The resultant ½ Vcc voltage is applied to the other terminal b of the primary winding T110 of the boosting transformer T100 and also to the emitter of the transistor Q11 in the first switching section 2 and the collector of the transistor Q12 in the second switching section 3 through the condenser C17, the primary winding T11 of the transformer T1 and the reactor L11.

Figure 4:
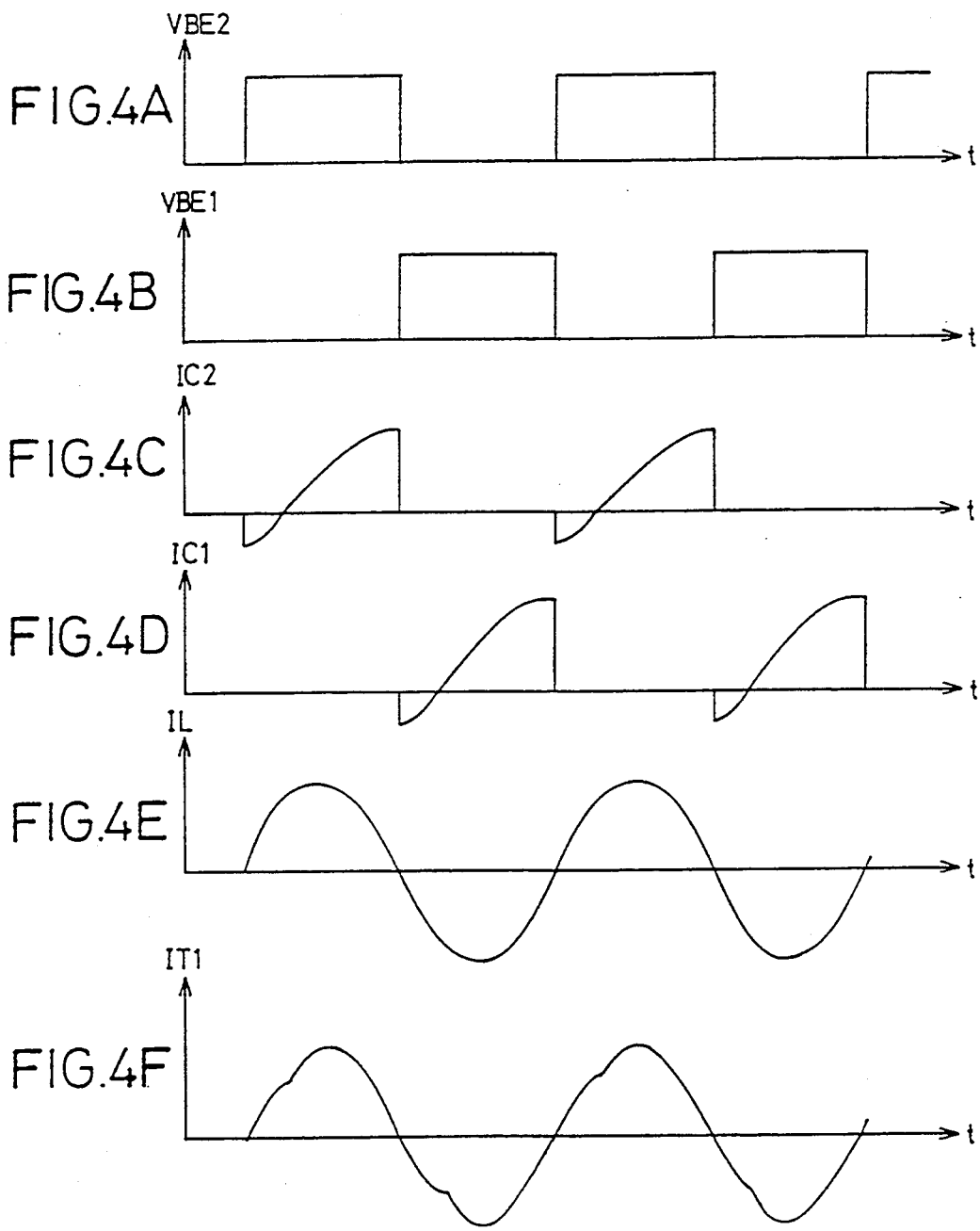
FIGS. 4A to 4F are waveform diagrams of signals from components in FIG. 2.

The DC voltage from the power source terminal Vcc is also charged on the condenser C11 through the resistors R11 and R12. When, after a predetermined time period based on a time constant of the resistors R11 and R12 and the condenser C11, a charging voltage on the condenser C11 appearing at the connection point of the resistors R11 and R12 reaches a level for biasing the diac DA11 into conduction, the diac DA11 conducts, thereby causing the voltage at the connection point of the resistors R11 and R12 to be applied to the condenser C15 and the base of the transistor Q12 through the diac DA11. As a result, the transistor Q12 is turned on. Namely, a high voltage as shown in FIG. 4A is applied to the base of the transistor Q12, resulting in the transistor Q12 being turned on. At this time, a collector current IC2 of the transistor Q12 flows as shown in FIG. 4C. It can be seen from FIG. 4C that the collector current IC2 of the transistor Q12 first falls negatively and then rises positively due to the operation of the diode D13. The condenser C15 functions absorb an initial spike voltage to prevent it from being applied to the base of the transistor Q12.

The conduction of the transistor Q12 in the second switching section 3 as mentioned above causes a current flow from the primary winding T110 of the boosting transformer T100 to the transistor Q12 in the second switching section 3 through the reactor L11. Namely, a main current from the power source terminal Vcc flowing through the condenser C19 flows through the condenser C17 and the primary winding T11 of the transformer T1 and through the primary winding T110 of the boosting transformer T100 and the condenser C18. Then, the current through the condenser C17 and the primary winding T11 of the transformer T1 and the current through the primary winding T110 of the boosting transformer T100 and the condenser C18 flow together to the transistor Q12 in the second switching section 3 through the reactor L11.

Accordingly, a current IL through the reactor L11 increases and decreases slowly as shown in FIG. 4E, thereby causing a current IT1 through the primary winding T11 of the transformer T1 to be as shown in FIG. 4F. The reason why a distortion is generated in the waveform of the current IT1 as shown in FIG. 4F is because a reverse current flows due to the operation of the diode D13 upon off/on switching of the transistor Q12 in the second switching section 3.

When no current, IT1 flows through the primary winding T11 of the transformer T1 as the current IL through the reactor L11 becomes zero, i.e., when the current IT1 is "0" as shown in FIG. 4F, a counter electromotive force is generated in the primary winding T11 of the transformer T1. The counter electromotive force in the primary winding T11 of the transformer T1 causes a high voltage to be induced at each dotted point of the secondary windings T21 and T22 of the transformer T1, thereby causing a high voltage to be applied to the base of the transistor Q11 in the first switching section 2 and a low voltage to be applied to the base of the transistor Q12 in the second switching section 3. As a result the transistor Q11 is turned on and the transistor Q12 is turned off.

In other words, since the high voltage induced in the dotted point of the secondary winding T21 of the transformer T1 is applied to the base of the transistor Q11 through the parallel connected condenser C12 and resistor R13, a base voltage VBE1 of the transistor Q11 becomes high as shown in FIG. 4B, thereby causing the transistor Q11 to conduct. The condenser C14 functions to absorb an initial spike voltage to prevent it from being applied to the base of the transistor Q11. Also, since a low voltage appears at the other terminal of the secondary winding T22 of the transformer T1 due to the high voltage induced in the dotted point thereof, a base voltage VBE2 of the transistor Q12 is discharged through the diode D15 and the secondary winding T22 of the transformer T1. As a result, the base voltage VBE2 of the transistor Q12 becomes low as shown in FIG. 4A, resulting in the transistor Q12 being turned off.

The conduction of the transistor Q11 as mentioned above causes a collector current IC1 thereof to flow as shown in FIG. 4D. Also, the current from the transistor Q11 flows through the resistor R17 and then through the reactor L11 to the primary winding T11 of the transistor base driving transformer T1 and the primary winding T110 of the boosting transformer T100 in the opposite direction to that in the case of conduction of the transistor Q12. Namely, the current through the reactor L11 flows to the condenser C20 through the primary winding T11 of the transformer T1 and the condenser C17. The current through the reactor L11 also flows to the condenser C20 through the condenser C18 and the primary winding T110 of the boosting transformer T100.

Then, the current IL through the reactor L11 negatively increases and decreases slowly as shown in FIG. 4E, thereby causing the current IT1 through the primary winding T11 of the transformer T1 to negatively increase and decrease slowly as shown in FIG. 4F.

When no current IT1 flows through the primary winding T11 of the transformer T1 as the current IL through the reactor L11 becomes zero, a counter electromotive force is generated in the primary winding T11 of the transformer T1, with its polarity being opposite to that in the previous case. The counter electromotive force in the primary winding T11 of the transformer T1 causes a low voltage to be induced at each dotted point of the secondary windings T21 and T22 of the transformer T1, thereby causing the base voltage VBE1 of the transistor Q11 to become low as shown in FIG. 4B and the base voltage VBE2 of the transistor Q12 to become high as shown in FIG. 4A. As a result, the transistor C11 is turned off and the transistor Q12 is turned on. In this case, a current from the primary winding T110 of the boosting transformer T100 flows to the transistor Q12 in the second switching section 3 through the reactor L11 as stated previously.

In this manner, the transistors Q11 and Q12 in the first and second switching sections 2 and 3 are repeatedly turned on/off, contrary to each other. As a result, an alternating current (At) voltage is applied to the primary winding T110 of the boosting transformer T100 on the basis of the on/off cycle of the transistors Q11 and Q12. The AC voltage in the primary winding T110 is induced being boosted in the secondary winding T120. The induced voltage in the secondary winding T120 is applied to the filaments of the series connected discharge lamps LP11 and LP12 through the current amount limiting condensers C31–C33, so that the discharge lamps LP11 and LP12 discharge and, thus, generate light.

At this time, relatively low voltages (for example, 3–4 V) are induced in the sub-secondary windings T121–T123 of the boosting transformer T100, with their polarity being opposite to that in the main secondary winding T120 and then applied to the filaments of the discharge lamps LP11 and LP12. As a result, the filaments of the discharge lamps LP11 and LP12 are preheated by the voltages induced in the sub-secondary windings T121–T123 before the discharge. The condenser C16 absorbs noise signals which are generated in the first and second switching sections 2 and 3, so as to remove them.

Figure 3:
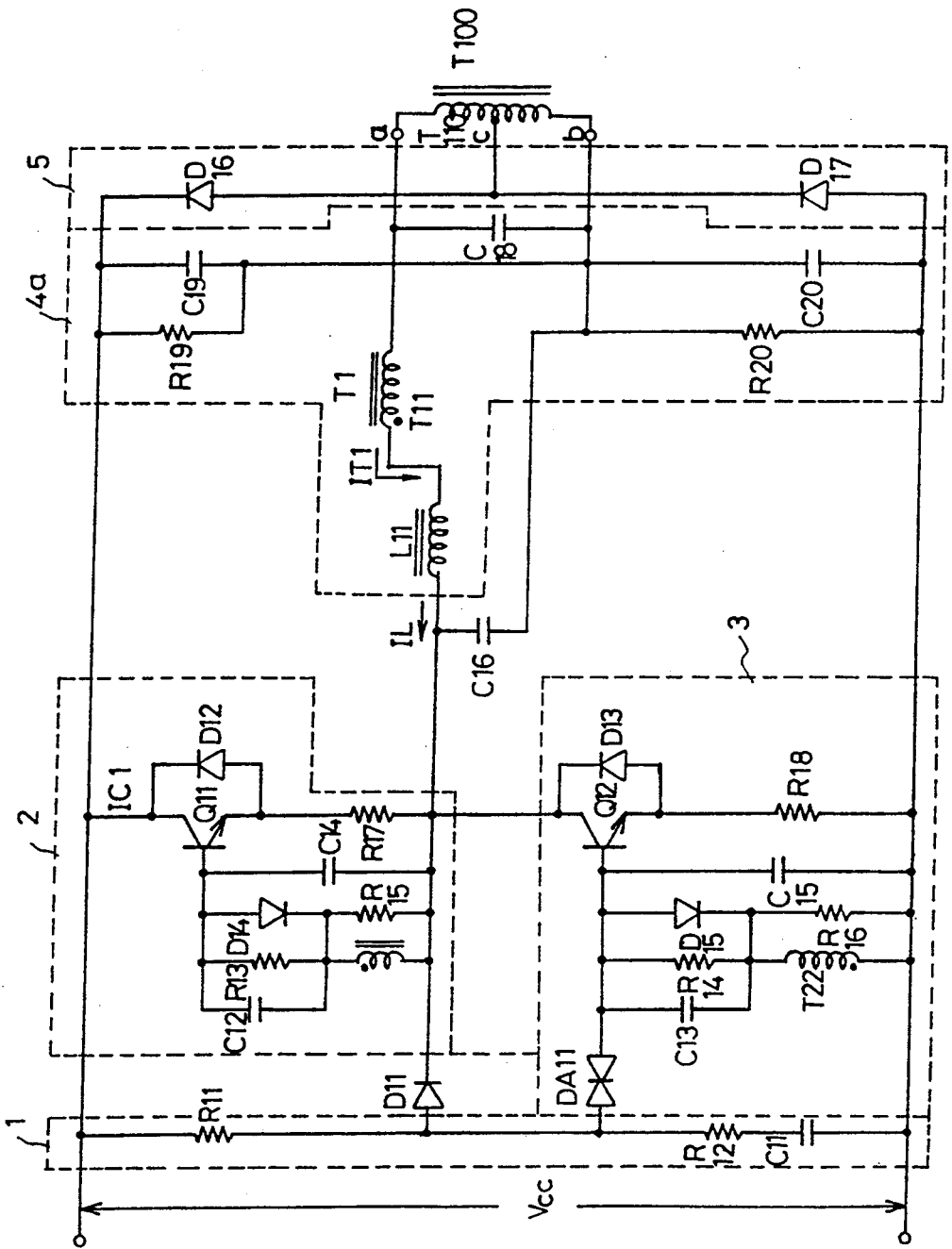
FIG. 3 is a circuit diagram of an electronic ballast circuit for discharge lamps in accordance with an alternative embodiment of the present invention.

FIG. 3 shows a modification of the arrangement of FIG. 2. The construction in this drawing is substantially the same as that in FIG. 2, with the exception that a resonance section 4a is different from the resonance section 4 in FIG. 2. In the resonance section 4a, the condenser C18 is connected between the one terminal a and the other terminal b of the primary winding T110 of the boosting transformer T100. The resistor R19 and the condenser C19 are connected in parallel between the power source terminal Vcc and the other terminal b of the primary winding T110 of the boosting transformer T100. The resistor R20 and the condenser C20 are connected in parallel between the other terminal b of the primary winding T110 of the boosting transformer T100 and the ground terminal. The reactor L11 has its one side connected to the one terminal a of the primary winding T110 of the boosting transformer T100 through the primary winding T11 of the transistor base driving transformer T1 and its other side connected to the connection point of the first and second switching sections 2 and 3 and the charging section 1. In this drawing, like reference numerals indicate like parts as compared with FIG. 2, since the construction of the drawing is substantially the same as that of FIG. 2.

Figure 5:
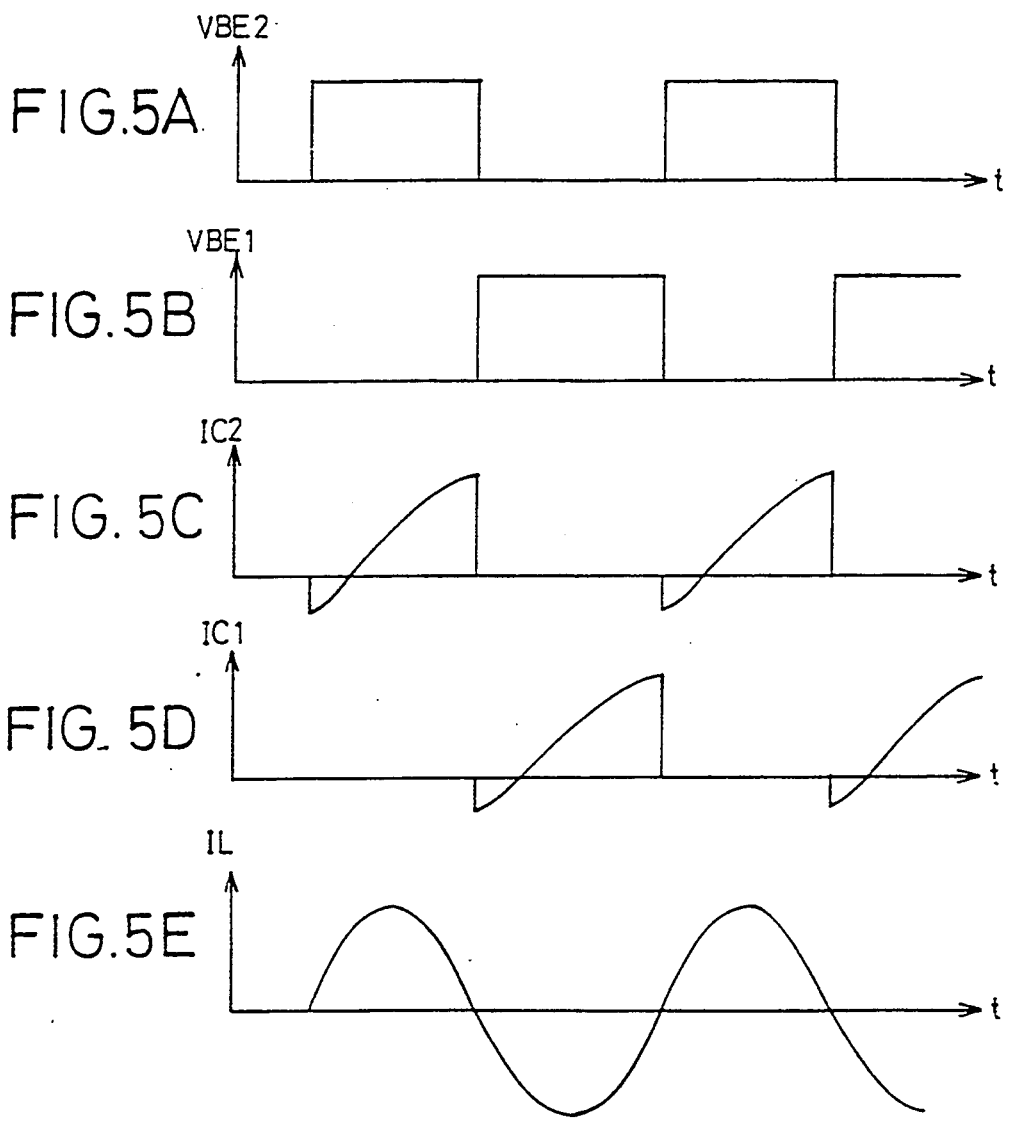
FIGS. 5A to 5E are waveform diagrams of signals from components in FIG. 3.

Similarly, the operation of the construction in FIG. 3 is substantially the same as that of FIG. 2. Namely, in operation, the base voltages VBE1 and VBE2 of the transistors Q11 and Q12 in the first and second switching sections 2 and 3 are as shown in FIGS. 5B and 5A and the collector currents IC1 and IC2 thereof are as shown in FIGS. 5D and 5C. As a result, the current IL through the reactor L11 is as shown in FIG. 5E.

Under the condition that the transistor Q11 is turned off and the transistor Q12 is turned on, a current from the primary winding T110 of the boosting transformer T100 flows to the transistor Q12 through the primary winding T11 of the transformer T1 and the reactor L11. On the contrary, under the condition that the transistor Q11 is turned on and the transistor Q12 is turned off, a current from the transistor Q11 flows to the condenser C18 and the primary winding T110 of the boosting transformer T100 through the reactor L11 and the primary winding T11 of the transformer T1.

As a result, the current IT1 through the primary winding T11 of the transformer T1 is the same as the current IL through the reactor L11, resulting in an amount of the current IT1 being large. For this reason, the current IT1 through the primary winding T11 of the transformer T1 has a waveform of little distortion since it is not sensitive to the turning-on/off of the transistors Q11 and Q12, thereby making the AC voltage to the primary winding T110 of the boosting transformer T100 more stable.

Figure 6:
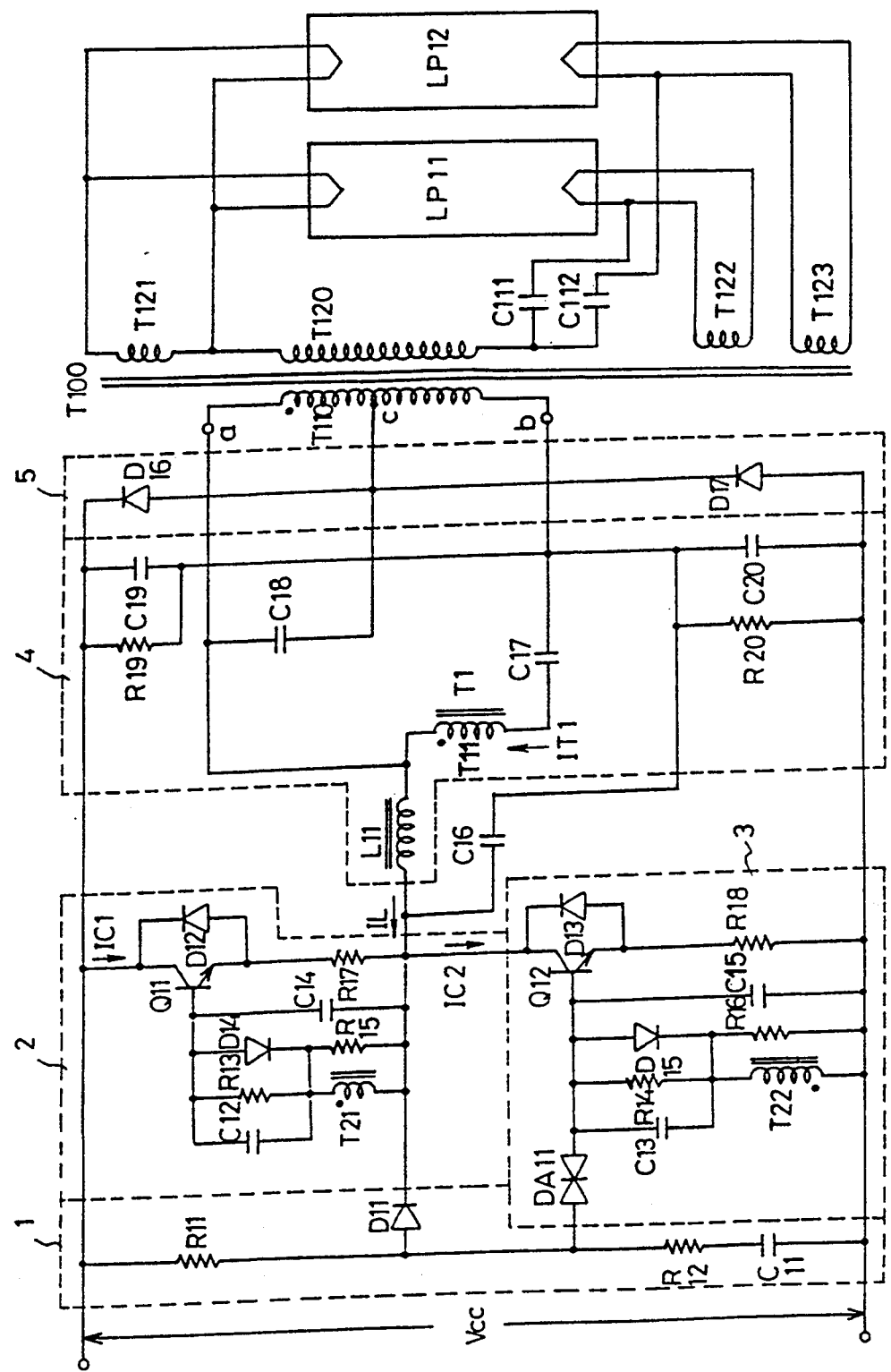
FIG. 6 is a circuit diagram of an electronic ballast circuit for discharge lamps in accordance with another embodiment of the present invention.

FIG. 6 is a circuit diagram of an electronic ballast circuit for discharge lamps in accordance with another embodiment of the present invention. The construction in this drawing is substantially the same as that in FIG. 2, with the exception that the discharge lamps LP11 and LP12 are connected in parallel. As shown in this drawing, the discharge lamps LP11 and LP12 are connected in parallel to the main secondary winding T120 of the boosting transformer T100 through condensers C111 and C112, respectively. The sub-secondary winding T121 of the boosting transformer T100 is connected commonly to one filament terminals of the discharge lamps LP11 and LP12. The sub-secondary windings T122 and T123 of the boosting transformer T100 are connected to the other filament terminals of the discharge lamps LP11 and LP12, respectively. Relatively low voltages are induced in the sub-secondary windings T121–T123 of the boosting transformer T100, with their polarity being opposite to that in the main secondary winding T120 and then applied to the filaments of the discharge lamps LP11 and LP12. As a result, the filaments of the discharge lamps LP11 and LP12 are preheated by the voltages induced in the sub-secondary windings T121–T123 before the discharge. In this embodiment, although the electronic ballast circuit has been applied to two discharge lamps LP11 and LP12, it can be applied to discharge lamps much more than those. This is achieved by increasing the turn number of the secondary winding T120 of the boosting transformer T100 and the number of the sub-secondary windings of the boosting transformer T100 and the associated condensers in proportion to the number of the discharge lamps. In this drawing, like reference numerals indicate like parts as compared with FIG. 2, since the construction of the drawing is substantially the same as that of FIG. 2. Also, the operation of the construction in FIG. 6 is substantially the same as that of FIG. 2 and a description thereof will thus be omitted.

As hereinbefore described, according to the present invention, the amount of the discharging current to each discharge lamp is decreased by half as compared with the prior art, so that a waveform distortion thereof is considerably enhanced. This has the effect of considerably enhancing a crest factor of the discharging current. Therefore, the circuit can be more reliable and a quality thereof can be increased. Also, the filaments of the discharge lamps, before application of the high discharging voltage thereto, are applied with the relatively low preheating voltage (for example, 3–4 V), resulting in a blackening being prevented at a discharging start point of time. Therefore, the life of the discharge lamps can be extended. Furthermore, when the number of the discharge lamps is intended to increase, this can be achieved by increasing the turn number of the main secondary winding of the boosting transformer and the number of the sub-secondary windings for generating the preheating voltages and the associated condensers in proportion to the number of the discharge lamps, with no increase in the number of the reactors and condensers constituting resonance circuits. This makes a size of the ballast circuit small and a weight thereof light and reduces the cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electronic ballast circuit for discharge lamps, comprising:
    boosting transformer means for applying a high voltage and having a first primary winding with a first terminal and a second terminal and a main secondary winding, said boosting transformer means applying the high voltage as a discharging voltage to at least one discharging lamp, the high voltage induced in said main secondary winding by one of a forward current and a reverse current flowing through said first primary winding of said boosting transformer;

charging means for applying a charging voltage from an input power source terminal;
a transistor base driving transformer, comprising:
a second primary winding having a first terminal and a second terminal,
a first secondary winding having a first terminal and a second terminal, and
a second secondary winding having a first terminal and a second terminal;
first switching means for conducting a first current when a forward voltage is induced in the first secondary winding of the transistor base driving transformer, wherein said first switching means includes a first condenser,
a first resistor connected in parallel to the first condenser,
a second resistor, and
a transistor wherein;
a collector of the transistor is connected to said power source terminal,
a base of the transistor is connected to the first terminal of said first secondary winding through said first condenser and first resistor, and
an emitter of the transistor is connected through said second resistor to a connection point of said charging means and said resonance means together with the second terminal of said first secondary winding;
second switching means for conducting a second current when at least one of a charging voltage on said charging means is at least equal to a predetermined level and a reverse voltage is induced in the second secondary winding;
resonance means for allowing the forward current to flow through said first primary winding when said first switching means conducts the first current, allowing the reverse current to flow through said first primary winding when said second switching means conducts the second current, and allowing a counter electromotive force to be induced in said second primary winding when one of the forward and reverse currents flowing through said first primary winding is stopped, so that the conduction of said first and second switching means can be controlled according to directions of currents induced in said first and second secondary windings by the counter electromotive force in said second primary winding; and
a plurality of condensers, each condenser connected between said secondary winding of said boosting transformer means and a filament of a corresponding one of said discharge lamps, said condensers limiting amounts of discharging currents to said discharge lamps.

2. An electronic ballast circuit for discharge lamps, as set forth in claim 1, wherein said charging means comprises:
a third resistor and a forth resistor, the third and forth resistors being serially connected with their connection point connected to said second switching means;
a second condenser connected to said power source terminal through said third and forth resistors; and
a diode connected to said first and second switching means and said resonance means.

3. An electronic ballast circuit for discharge lamps, as set forth in claim 1, wherein said first switching means further includes:
a second condenser connected to the base of said transistor;
a first diode connected to the base of said transistor; and
a third resistor connected to said first diode;
the base of said transistor connected commonly to said first terminal of said first secondary winding and said third resistor through said first diode.

4. An electronic ballast circuit for discharge lamps, as set forth in claim 3, wherein said first switching means further includes:
a second diode connected between the emitter and the collector of said transistor.

5. An electronic ballast circuit for discharge lamps, as set forth in claim 4, wherein said first switching means includes a field effect transistor instead of said transistor and said second diode.

6. An electronic ballast circuit for discharge lamps, comprising:
boosting transformer means for applying a high voltage and having a first primary winding with a first terminal and a second terminal and a main secondary winding, said boosting transformer means applying the high voltage as a discharging voltage to at least one discharging lamp, the high voltage induced in said main secondary winding by one of a forward current and a reverse current flowing through said first primary winding;
charting means for applying a charging voltage from an input power source terminal;
a transistor base driving transformer, comprising:
a second primary winding having a first terminal and a second terminal,
a first secondary winding having a first terminal and a second terminal, and
a second secondary winding having a first terminal and a second terminal;
first switching means for conducting a first current when a forward voltage is induced in the first secondary winding of the transistor base driving transformer;
second switching means for conducting a second current when at least one of a charging voltage on said charging means is at least equal to a predetermined level and a reverse voltage is induced in the second secondary winding of said transistor base driving transformer, wherein said second switching means comprises:
a diac connected to an output of said charging means,
a first condenser,
a first resistor connected in parallel to the first condenser,
a second resistor, and
a transistor, wherein
a base of the transistor is connected to said diac and to the first terminal of said second secondary winding through said first condenser and first resistor,
an emitter of the transistor connected to a ground terminal through said second resistor, and
a collector of the transistor connected to a connection point of said charging means and said resonance means, a second condenser connected to the base of said transistor, a first diode connected to the base of said transistor, and a third resistor connected to said first diode, wherein the base of said transistor is connected commonly to said first terminal of said second secondary winding and said third resistor through said first diode, the second terminal of said second secondary winding is connected to the ground terminal;

resonance means for allowing the forward current to flow through said first primary winding when said first switching means conducts the first current, allowing the reverse current to flow through said first primary winding when said second switching means conducts the second current, and allowing a counter electromotive force to be induced in said second primary winding when one of the forward and reverse currents flowing through said first primary winding is stopped, so that the conduction of said first and second switching means can be controlled according to directions of currents induced in said first and second secondary windings of said transistor base driving transformer by the counter electromotive force in said second primary winding; and a plurality of condensers, each condenser connected between said secondary winding of said boosting transformer means and a filament of a corresponding one of said discharge lamps, said condensers limiting amounts of discharging currents to said discharge lamps 7. An electronic ballast circuit for discharge lamps, as set forth in claim 6, wherein said second switching means further includes:

a second diode connected between the emitter and the collector of said transistor.

8. An electronic ballast circuit for discharge lamps, as set forth in claim 7, wherein said second switching means includes a field effect transistor instead of said transistor and said second diode.

9. An electronic ballast circuit for discharge lamps, as set forth in claim 1, wherein said resonance means includes:

a second condenser connected between the first terminal and a central terminal of said first primary winding;

a third resistor and a third condenser connected in parallel between said power source terminal and the second terminal of said first primary winding;

a forth resistor and a forth condenser connected in parallel between the second terminal of said first primary winding and the ground terminal;

a reactor connected between a connection point of said first terminal of said first primary winding and the first terminal of said second primary winding and a connection point of said first and second switching means and said charging means; and a fifth condenser connected between the second terminal of said second primary winding and the second terminal of said first primary winding.

10. An electronic ballast circuit for discharge lamps, as set forth in claim 1, wherein said resonance means includes:

a second condenser connected between the first terminal and the second terminal of said first primary winding;

a third resistor and a third condenser connected in parallel between said power source terminal and the second terminal of said first primary winding;

a forth resistor and a forth condenser connected in parallel between the second terminal of said first primary winding and the ground terminal; and a reactor having a first side connected to said first terminal of said first primary winding through said second primary winding and a second side connected to a connection point of said first and second switching means and said charging means.

11. An electronic ballast circuit for discharge lamps, as set forth in claim 1, further comprising high voltage removing means for preventing a high voltage from being induced in said first primary winding of said boosting transformer means upon switching of said first and second switching means.

12. An electronic ballast circuit for discharge lamps, as set forth in claim 11, wherein said high voltage removing means comprises:

a first diode connected between a central terminal of said first primary winding and said power source terminal; and a second diode connected between said central terminal of said first primary winding and a ground terminal.

13. An electronic ballast circuit for discharge lamps, as set forth in claim 1, wherein said boosting transformer means includes a plurality of sub-secondary windings for applying preheating voltages to said filaments of said discharge lamps.

14. An electronic ballast circuit for discharge lamps, as set forth in claim 1, further comprising:

a noise removing condenser connected between said first primary winding of said boosting transformer means and a connection point of said first and second switching means and said resonance means.

15. An electronic ballast circuit for discharge lamps, comprising:

boosting transformer means for applying a high voltage and having a first primary winding with a first terminal and a second terminal and plural secondary windings including a main secondary winding, said boosting transformer means applying the high voltage as a discharging voltage to at least one discharging lamp, the high voltage induced in said main secondary winding by one of a forward current and a reverse current flowing through said first primary winding of said boosting transformer;

charging means for applying a charging voltage from an input power source terminal;

a transistor base driving transformer, including:

a second primary winding having a first terminal and a second terminal;

a first secondary winding having a first terminal and a second terminal; and a second secondary winding having a first terminal and a second terminal; wherein the transistor base driving transformer maintains substantially constant a resonance frequency of a resonance means independent of a number of secondary windings of the boosting transformer;

first switching means for conducting a first current when a forward voltage is induced in the first secondary winding;

second switching means for conducting a second current when at least one of a charging voltage on said charging means is at least equal to a predetermined level and a reverse voltage is induced in the second secondary winding;

the resonance means for allowing the forward current to flow through said first primary winding when said first switching means conducts the first current, allowing the reverse current to flow through said first primary winding when said second switching means conducts the second current, and allowing a counter electromotive force to be induced in said second primary winding when one of the forward and reverse currents flowing through said first primary winding is stopped, so that the conduction of said first and second switching means can be controlled according to directions of currents induced in said first and second secondary windings by the counter electromotive force in said second primary winding; and a plurality of condensers, each condenser connected between said secondary winding of said boosting transformer means and a filament of a corresponding one of the discharge lamps, said plurality of condensers limiting amounts of discharging currents to said discharge lamps.

16. An electronic ballast circuit for discharge lamps, as set forth in claim 15, wherein said charging means comprises:

a first resister and a second resister, the first and second resisters being serially connected with their connection point connected to said second switching means;

a condenser connected to said power source terminal through said first and second resistors; and a diode connected to said first and second switching means and said resonance means.

* * * * *